United States Patent [19]

Kidoh et al.

[11] 4,091,055
[45] May 23, 1978

[54] LIGHT TRANSMITTING POLYVINYLIDENE FLUORIDE OR VINYLIDENE FLUORIDE COPOLYMER COMPOSITIONS

[75] Inventors: Kunizoh Kidoh; Yoshio Kudo; Fujio Suzuki, all of Iwaki, Japan

[73] Assignee: Kureha Kagaku Kogyo Kabushiki Kaisha, Tokyo, Japan

[21] Appl. No.: 687,763

[22] Filed: May 19, 1976

[30] Foreign Application Priority Data

May 23, 1975 Japan .................................. 50-61571

[51] Int. Cl.$^2$ ............................................. C08L 27/16
[52] U.S. Cl. ............................. 260/900; 260/DIG. 32
[58] Field of Search .......................................... 260/900

[56] References Cited

U.S. PATENT DOCUMENTS

| 3,253,060 | 5/1966 | Koblitz et al. | 260/900 |
| 3,524,906 | 8/1970 | Schmitt et al. | 260/900 |

*Primary Examiner*—Carman J. Seccuro
*Attorney, Agent, or Firm*—Lane, Aitken, Dunner & Ziems

[57] ABSTRACT

Light-transmitting compositions containing (1) 50–99% by weight of polyvinylidene fluoride or a vinylidene fluoride copolymer and (2) 1–50% by weight of a copolymer of a vinyl fluoride monomer and at least one acrylate monomer selected from the group consisting of alkyl acrylates and alkyl methacrylates wherein the alkyl group contains from one to four carbon atoms.

4 Claims, No Drawings

LIGHT TRANSMITTING POLYVINYLIDENE FLUORIDE OR VINYLIDENE FLUORIDE COPOLYMER COMPOSITIONS

FIELD OF THE INVENTION

This invention relates to a polyvinylidene fluoride composition or a vinylidene fluoride copolymer composition which is capable of exhibiting an excellent light-transmitting property over a wide spectrum of wavelengths ranging from ultraviolet to visible.

BACKGROUND OF THE INVENTION

The degree of crystallinity and the rate of crystallization which polyvinylidene fluoride (hereinafter referred to as "PVDF") exhibits at the time of molding are generally high. Usually, when the PVDF is melted at the time of molding, α-type crystals of a spherulitic structure, measuring from several microns to tens of microns are formed in the resultant melt. The shaped product consequently obtained, therefore, exhibits inferior light-transmitting properties over a wide spectrum of wavelengths ranging from ultraviolet to infrared. Although PVDF inherently possesses an excellent light-transmitting property, it cannot manifest this property to full advantage while it is undergoing a molding treatment.

To date, the methods indicated in (1) through (5) below have been suggested for the improvement of light-transmitting properties (or transparency) of shaped articles of PVDF.

(1) The method whereby the molding of PVDF is effected in the presence of an added agent capable of giving crystal nuclei.
(2) The method whereby the PVDF melt is cooled suddenly in the course of shaping.
(3) The method whereby the shaped PVDF article is oriented by stretching before it is allowed to solidify.
(4) The method whereby PVDF is blended with polymethyl methacrylate (hereinafter referred to as "PMMA") and then shaped.
(5) The method whereby PVDF is blended with polyvinyl fluoride and then shaped.

In the method of (1), however, an inorganic or organic substance such as potassium chloride, kaoline or flavanthrone is used as the agent for providing crystal nuclei and such a substance is incapable of mixing with PVDF with sufficient uniformity and, therefore, constitutes what may be called a foreign matter in the PVDF. Consequently, the shaped article obtained has disadvantages in that it assumes the color imparted by the agent, sacrifices the PVDF's inherent thermal stability and, in particular, suffers serious degradation in the transmission of ultraviolet rays of short wavelengths ranging from 280 mμ to 350 mμ. While method (1) provides improvement in the transmission of rays in the visible zone, it is nevertheless limited because it fails to improve the shaped PVDF product in its ability to transmit rays in the remaining spectrum. Method (2) has the disadvantage that the shaped article obtained by this method opacifies with elapse of time since the interior of the article undergoes gradual crystallization owing to factors such as temperature condition under which the shaped article is put to use. A shaped article obtained by this method such as an extruded film or sheet, for example, possesses a fairly advantageous light-transmitting property at the time of its production. When it is exposed to sunlight for a prolonged period however, the phenomenon of temperature hysteresis causes a gradual crystallization. As a result, the shaped article has its light-transmitting property seriously degraded over a wide spectrum of wavelengths ranging from ultraviolet to infrared, and eventually is totally deprived of transparency. In method (3), the shaped articles obtained are limited to films and sheets. Moreover, the stretching treatment included in the process brings about orientation of the molecules in the shaped articles. Thus, the shaped articles suffer from the disadvantage that the physical properties reflect the directionality of the molecular orientation and thereof, the tear strength is degraded. Method (4), in order to impart to the shaped products sufficient transparency over a wide spectrum of wavelengths including those in the visible ray zone, requires the PVDF to be blended with at least 25 percent by weight of PMMA. Because of the use of such a large proportion of PMMA, the inherent properties of PVDF such as chemical resistance, thermal resistance, rigidity and flame retardancy are impaired and the mechanical properties are degraded as well. The shaped product obtained by this method, therefore, entails the disadvantage that it deteriorates with age. In the case of method (5), there is the disadvantage that the shaped product obtained by this method is deficient in both thermal stability and transparency because polyvinyl fluoride has inferior thermal stability and provides no satisfactory compatibility with PVDF.

SUMMARY OF THE INVENTION

It is, therefore, an object of the present invention to provide a polyvinylidene fluoride composition or a vinylidene fluoride copolymer composition which exhibits excellent light-transmission over a wide spectrum of wavelengths and at the same time satisfactorily retains the various inherent properties of PVDF intact.

This object and the other objects of the present invention will become apparent from the description below. It has now been discovered that a composition having a specific copolymer material incorporated, in a proportion falling within a specific range, into PVDF or a vinylidene fluoride copolymer meets these requirements.

According to the present invention, there is provided a polyvinylidene fluoride composition or a vinylidene fluoride copolymer composition, which includes PVDF or a vinylidene fluoride copolymer and a copolymer material of vinyl fluoride monomer and at least one acrylate monomer selected from the group consisting of alkyl acrylates and alkyl methacrylates.

DETAILED DESCRIPTION OF THE INVENTION

The PVDF used in the present invention is the homopolymer of vinylidene fluoride. The vinylidene fluoride copolymer (hereinafter referred to as "VDF copolymer") used in this invention is a copolymer of vinylidene fluoride with other fluoride-containing alkylene monomers with the vinylidene fluoride present in an amount of not less than 90 percent by weight). Examples of the fluorine-containing alkylene monomers include vinyl fluoride, monochloro-trifluoroethylene, trifluoroethylene, tetrafluoroethylene, fluorochlorovinylidene, difluoro-dichloro-ethylene, difluoromonochloro-ethylene, hexafluoropropylene and pentafluoropropylene.

The copolymer of vinyl fluoride monomer with at least one acrylate monomer selected from alkyl acrylates and alkyl methacrylates is a copolymer which consists of 99 to 40 percent by weight of the acrylate monomer and 1 to 60 percent by weight of the vinyl fluoride monomer. Particularly the copolymer is preferred to contain 80 to 60 percent by weight of the acrylate monomer and 20 to 40 percent by weight of the vinyl fluoride monomer. The copolymer material of such a composition may be produced by suspension polymerization, emulsion polymerization, graft polymerization or some other suitable method of polymerization. Examples of the copolymer material include alkyl acrylate-vinyl fluoride copolymer, alkyl methacrylate-vinyl fluoride copolymer and alkyl acrylate-alkyl methacrylate-vinyl fluoride terpolymer. In the alkyl acrylates and alkyl methacrylates, the alkyl groups are lower alkyl groups having from one to four carbon atoms, preferably methyl or ethyl groups.

The composition of the present invention includes 99 to 50 percent by weight of the PVDF or the VDF copolymer and 1 to 50 percent by weight of the copolymer of vinyl fluoride monomer containing at least one acrylate monomer selected from the group consisting of alkyl acrylates and alkyl methacrylates. In order that the composition may retain the inherent properties of PVDF such as chemical resistance and flame retardance, the proportion in which the copolymer material is added to the PVDF or the VDF copolymer is preferred to be not more than 15 percent by weight. The composition of this invention gives excellent transmission of ultraviolet rays (capable of transmitting more than 60 percent of physiologically active ultraviolet rays of wavelengths from 280 to 330 m$\mu$ which glass or ordinary plastic film cannot transmit), of visible rays (capable of transmitting more than 80 percent of visible rays) and of infrared rays (capable of transmitting more than 90 percent of infrared rays of wavelengths from 800 to 1,400 m$\mu$). These compositions also possess other excellent properties such as chemical resistance and thermal resistance and, therefore, can be applied to various uses. For example, the composition of this invention can be used for pipes, valves and other similar industrial materials requiring chemical resistance, thermal resistance and transparency, also as sheets and films having excellent ultraviolet ray-transmitting property, flame-retardancy and weather-resistance and also as filaments having transparency. Sheets or film, of this composition may advantageously be used in sun-rooms or in hothouses in place of glass. Filaments made of the composition of the present invention can be used as optical fibers.

Shaped articles utilizing the composition of the present invention can be obtained by mixing either PVDF or VDF copolymer with the copolymer material in the proportions given above and then shaping the resultant blend by an ordinary method. For convenience in shaping, it is preferable to use the VDF copolymer rather than the PVDF. When a VDF copolymer is used, such as a vinylidene fluoride-monochloro-trifluoroethylene copolymer (95 : 5 weight ratio) or vinylidene fluoride-tetrafluoroethylene copolymer (95 : 5 weight ratio) only half as much of the copolymer material is required to obtain the same degree of light-transmittance as when PVDF is used, yet it avoids degradation of elongation with elapse of time, such as is observed in shaped articles obtained by using the PVDF, and exhibits impact resistance superior to that shown by the shaped article obtained by using PVDF. As described above, the concept of this invention requires the PVDF or the VDF copolymer to be mixed with the copolymer of vinyl fluoride monomer, and at least one arcylate monomer selected from the group consisting of alkyl acrylates and alkyl methacrylates. In this connection, it should be noted that where the PVDF or VDF copolymer is mixed with polyvinyl fluoride (homopolymer) and a polyalkyl acrylate or polyalkyl methacrylate, the resulting shaped article is inferior to those obtained from the composition of the present invention.

The present invention will be described more specifically below with reference to preferred embodiments which description is not intended to limit the invention.

EXAMPLE 1

An autoclave of stainless steel having an inner volume of 1 liter and provided with a stirrer was charged with 600 parts by weight of a deionized water solution containing 0.4 part by weight of methyl cellulose (SM-100 made by Shinetsu Chemical Industry Co., Ltd.), 2.0 parts by weight of di-normal-propyl peroxy-dicarbonate, and 120 parts by weight of methyl methacrylate (MMA containing 0.05 percent by weight of hydroquinone) and the gaseous phase in the autoclave was displaced with nitrogen. Subsequently, 80 parts by weight of vinyl fluoride (VF) monomer was introduced under pressure. In a water bath at 35° C, the contents of the autoclave were stirred for 20 hours to induce polymerization. 183 parts by weight of white polymer was obtained.

This polymer (copolymer material) swells slightly and does not dissolve in acetone and benzene. It dissolves in dimethylformamide and dimethyl sulfoxide at temperatures above 100° C. Analysis for fluorine showed the polymer to contain 12.9 percent by weight fluorine and the weight ratio of MMA/VF to be 68 : 32.

This copolymer material was blended in varying proportions of 3, 5 and 10 percent by weight with polyvinylidene fluoride (PVDF). The resultant blends were roll-kneaded at 170° C and thereafter hot pressed at 220° C under 100 kg/cm$^2$ for three minutes, then cooled to below 135° C (the temperature for crystallization of polyvinylidene fluoride) and shaped into sheets having a thickness of 0.3 mm.

These sheets were compared with reference sheets which were obtained by the same procedure using instead polyvinylidene fluoride alone or a blend of polyvinylidene with polymethyl methacrylate (PMMA) of an amount mentioned above. They were found to transmit more of the rays ranging from those of the ultraviolet zone having wavelengths of 300 m$\mu$ to those of the visible zone having wavelengths of 700 m$\mu$ than the reference sheets. They also had the excellent flame-retardancy inherent to PVDF. This data for light-transmitting and flame-retardancy of these sheets is shown in Table 1 in comparison to the reference sheets. Where PMMA was blended, sheets containing 30 percent by weight or more of PMMA were found to have high brittleness and high flammability, although they manifested excellent ultraviolet ray-transmission. However, their ultraviolet ray-transmitting ability tended to degrade with elapse of time.

EXAMPLE 2

The same 1-liter autoclave used in Example 1 was charged with 600 parts by weight of an aqueous 1 percent sodium perfluorooctanate solution (adjusted in advance to pH 3.8), 0.7 part by weight of an aqueous 35 percent hydrogen peroxide solution, 0.25 part by weight of rongalite and 140 parts by weight of MMA. The aqueous phase within the autoclave was displaced with nitrogen. Thereafter, 60 parts of VF monomer was introduced under pressure. The autoclave contents were polymerized for six hours, with the polymerization temperature kept at 25° C. The resultant latex was salted out with an aqueous 1 percent calcium chloride solution, washed, dehydrated and dried to yield 180 parts by weight of polymer (copolymer material). Analysis for fluorine showed this polymer to have an MMA/VF weight ratio of 78 : 22. This copolymer material was blended in the proportions of 5, 10, 15 and 20 percent by weight with PVDF and the blends were roll-kneaded at 170° C, hot pressed at 220° C under 100 kg/cm$^2$ for three minutes and cooled to produce sheets 0.3 mm in thickness. These sheets invariably exhibited excellent light-transmission. The results are shown in Table 1.

EXAMPLE 3

By following the procedure of Example 2, a copolymer material (A) consisting of MMA and VF in a weight ratio of 94 : 6 and another copolymer material (B) consisting of the same monomers in a weight ratio of 45 : 55 were prepared. The copolymer material (A) was blended in the proportions of 20 and 30 percent by weight and the copolymer material (B) in the proportions of 1, 2 and 3 percent by weight respectively with PVDF, to produce sheets 0.3 mm in thickness.

These sheets exhibited values for light-transmission and flammability as shown in Table 1. It is significant that incorporation of the copolymer materials in relatively small proportions improves the shaped articles in transparency without impairing the various desirable properties inherent to PVDF.

EXAMPLES 4, 5 and 6

In the same polymerization medium (containing sodium perfluoro-octanate, aqueous hydrogen peroxide solution and rongalite) used in Example 2, there was added 1.0 part by weight of dimercaptodecane as the chain transfer agent and 140 parts each by weight of MMA (for Example 4), ethyl methacrylate (EMA, for Example 5) and methyl acrylate (MA, for Example 6) as the alkyl(meth)acrylate respectively and the gaseous phase within the vessel was displaced with nitrogen. Thereafter, 60 parts by weight of VF monomer was introduced into each system under pressure. The contents of each system were polymerized for six hours with the polymerization temperature kept at 25° C.

The latexes obtained were each salted out with an aqueous 5 percent NaCl solution, washed with water, dehydrated and dried to yield 186.8, 186.8 and 188.6 parts by weight respectively of polymers (copolymer materials).

EXAMPLE 7

In the polymerization medium of Examples 4–6 containing the same chain transfer agent, 70 parts by weight of MA was added as the monomer and the gaseous phase within the reaction system was displaced with nitrogen. Thereafter, 60 parts by weight of VF monomer was introduced under pressure. The contents of the reaction system were polymerized for one hour with the polymerization temperature kept at 25° C. Subsequently, 70 parts by weight of MMA was introduced into the system under pressure, with the polymerization continued for five more hours. The latex obtained was treated by the same procedure as in Examples 4–6, to yield 191 parts by weight of a copolymer material.

EXAMPLE 8

In the polymerization medium of Example 7 containing the same chain transfer agent, 28 parts by weight of MMA and 42 parts by weight of MA were added and the gaseous phase within the reaction system was dis- Table 1

| | Composition of copolymer material (weight ratio) | | Amount of copolymer material in PVDF composition | Light-transmission percent at each wavelength (%) | | | |
|---|---|---|---|---|---|---|---|
| | MMA | VF | (weight %) | 300mμ | 500mμ | 700mμ | Combustibility |
| Example 1 | 68 | 32 | 3 | 48 | 80 | 85 | Self-extinguishing |
| Example 1 | 68 | 32 | 5 | 53 | 84 | 91 | Self-extinguishing |
| Example 1 | 68 | 32 | 10 | 55 | 84 | 91 | Natural extinguishing |
| Example 2 | 78 | 22 | 5 | 45 | 80 | 88 | Self-extinguishing |
| Example 2 | 78 | 22 | 10 | 58 | 86 | 90 | Natrual extinguishing |
| Example 2 | 78 | 22 | 15 | 65 | 88 | 91 | Natural extinguishing |
| Example 2 | 78 | 22 | 20 | 67 | 88 | 91 | Natural extinguishing |
| Example 3(A) | 94 | 6 | 20 | 66 | 87 | 92 | Natural extinguishing |
| Example 3(A) | 94 | 6 | 30 | 71 | 88 | 92 | Natural extinguishing |
| Example 3(B) | 45 | 55 | 1 | 25 | 71 | 82 | Self-extinguishing |
| Example 3(B) | 45 | 55 | 2 | 31 | 76 | 85 | Self-extinguishing |
| Example 3(B) | 45 | 55 | 3 | 38 | 81 | 88 | Self-extinguishing |
| Comparative Example 1 | — | — | 0 | 4 | 28 | 48 | Self-extinguishing |
| Comparative Example 2 | 100 | 0 | 20 | 17 | 48 | 65 | Self-combustion |
| Comparative Example 3 | 100 | 0 | 30 | 73 | 89 | 92 | Self-combustion |

(Note):
Test for combustibility: A ribbon 20 mm in width was cut off a given sheet and held in a vertical position. While the ribbon so held, the lower end thereof was brought into contact with the frame of an alcohol lamp and allowed to catch fire. The extent of combustion of the ribbon was observed.
[a] Self-extinguishing
The flame on the ribbon was extinguished at once after removal of the alcohol lamp.
[b] Natural extinguishing
The flame on the ribbon was extinguished shortly after removal of the alcohol lamp.
[c] Self-combustion
The combustion of the ribbon continued even after removal of the alcohol lamp.

placed with nitrogen. Thereafter, 60 parts by weight of VF monomer was introduced under pressure. The contents of the system were polymerized for one hour with the polymerization temperature kept at 25° C. Subsequently, 70 parts by weight of MMA was introduced into the system under pressure, with the polymerization continued for five more hours. The latex obtained was treated by the same procedure as used in Examples 4–6, to yield 185 parts by weight of a copolymer material.

The copolymer materials obtained in Examples 4 through 8 were blended each in a proportion of 10 percent by weight with the homopolymer of VDF and in a proportion of 5 percent by weight with the copolymer of VDF/monochloro-trifluoroethylene (95 : 5 by weight ratio). The resultant blends were each roll-kneaded at 170° C, hot pressed at 220° C under 100 kg/cm² for three minutes to produce films 120 μ in thickness. The films were tested for light-transmittance at a wavelength of 300 mμ. The results were as shown in Table 2. Reference Examples 4 and 5, were produced under the same conditions as described above by using the homopolymer of VDF and the VDF/monochloro-tri-fluoroethylene (95 : 5 by weight ratio) copolymer alone.

The results indicate that the incorporation of alkyl(-meth)acrylate/VF copolymer and alkylmethacrylate/alkylacrylate/VF terpolymer, in a small proportion serves to improve notably the transparency of the VDF polymer. It is also shown that incorporation thereof in a still smaller proportion to the copolymer having VDF as the principal component is effective.

The fact that all these copolymer materials enjoy excellent thermal stability and also the fact that blends of these copolymer materials with the VDF polymer do not induce coloration even in the course of or after molding are believed to be factors contributing to the improvement of transparency.

Table 2

| | Composition of copolymer material (weight ratio) | Light-transmission percent at a wavelength of 300 mμ(%), 120μ films | |
|---|---|---|---|
| | | Blended in a proportion of 10% by weight with the homopolymer of VDF | Blended in a proportion of 5% by weight with the copolymer of VDF/Cl-3F ethylene (95/5) |
| Example 4 | MMA/VF = 75.0/25.0 | 73 | 75 |
| Example 5 | EMA/VF = 75.0/25.0 | 66 | 68 |
| Example 6 | MA/VF = 74.2/25.8 | 45 | 59 |
| Example 7 | MA/MMA/VF = 36.7/36.7/26.6 | 67 | 64 |
| Example 8 | MA/MMA/VF = 22.7/52.9/24.4 | 72 | 75 |
| Reference Example 4 | | 17 | — |
| Reference Example 5 | | — | 30 |

What is claimed is:

1. A composition consisting essentially of (1) 50–99% by weight of polyvinylidene fluoride or a vinylidene fluoride copolymer and (2) 1–50% by weight of a copolymer of 6 to 60 percent by weight of a vinyl fluoride monomer and 94 to 40 percent be weight of at least one acrylate monomer selected from the group consisting of alkyl acrylates and alkyl methacrylates wherein the alkyl group contains from one to four carbon atoms.

2. The composition according to claim 1, wherein said vinylidene fluoride copolymer consists of 90 percent or more by weight of vinylidene fluoride and 10 percent or less by weight of the other fluorine-containing alkylene monomer.

3. The composition according to claim 2, wherein said fluorine-containing alkylene monomer is vinyl fluoride, monochloro-trifluoro-ethylene, trifluoro-ethylene, tetrafluoro-ethylene, fluorochlorovinylidene, dichloro-difluoro-ethylene, monochloro-difluoro-ethylene, hexafluoropropylene or pentafluoropropylene.

4. The composition according to claim 1, wherein said alkyl group is methyl or ethyl.

* * * * *